(12) United States Patent
Jansen et al.

(10) Patent No.: US 7,913,973 B1
(45) Date of Patent: Mar. 29, 2011

(54) REVERSE FLOW FUELDRAULIC VALVE

(75) Inventors: Harvey B. Jansen, Mesa, AZ (US);
John F. Calleja, Gilbert, AZ (US);
Rickie P. Western, Gold Canyon, AZ (US)

(73) Assignee: Jansen's Aircraft Systems Controls, Inc., Tempe, AZ (US)

( * ) Notice: Subject to any disclaimer, the term of this patent is extended or adjusted under 35 U.S.C. 154(b) by 588 days.

(21) Appl. No.: 11/838,110

(22) Filed: Aug. 13, 2007

Related U.S. Application Data

(60) Provisional application No. 60/837,384, filed on Aug. 11, 2006.

(51) Int. Cl.
*F16K 47/00* (2006.01)

(52) U.S. Cl. ............... 251/122; 251/30.02; 251/63.6

(58) Field of Classification Search ........... 251/30.01, 251/30.02, 62, 63, 63.6, 120, 121, 122, 123, 251/124
See application file for complete search history.

(56) References Cited

U.S. PATENT DOCUMENTS

| | | | | |
|---|---|---|---|---|
| 1,970,726 A | * | 8/1934 | Barrett | 251/122 |
| 2,061,852 A | * | 11/1936 | Schweitzer | 251/122 |
| 2,439,523 A | * | 4/1948 | Miller et al. | 251/30.02 |
| 3,180,360 A | * | 4/1965 | Pavlin | 137/625.5 |
| 3,788,400 A | * | 1/1974 | Tufts | 169/11 |
| 5,813,801 A | * | 9/1998 | Newbolt et al. | 406/14 |
| 6,250,602 B1 | | 6/2001 | Jansen | |
| 6,749,173 B2 | * | 6/2004 | Heiling | 251/30.03 |
| 6,783,108 B2 | | 8/2004 | Jansen | |

* cited by examiner

*Primary Examiner* — John K Fristoe, Jr.
(74) *Attorney, Agent, or Firm* — Quarles & Brady LLP

(57) ABSTRACT

A reverse flow valve for metering high pressure gaseous media, such as ignition media to the injectors of a scramjet engine in a hyerpsonic flight vehicle, has a metering member that moves parallel to the flow direction of the metered media and throttles the valve in a direction counter to the flow direction. This reduces side loading on the metering member and permits the use of a lighter and smaller actuating mechanism. The metering member can be a pintle having a uniquely configured pintle seat providing bubble tight shut off of the inlet flow without effecting the critical flow contour of the media. The pintle can be driven by a piston that is responsive to push-pull forces of pressurized drive fluid under servo control. The drive fluid is isolated from the gaseous media by a primary seal, which can be seated on the piston without deformation by a seal retainer. The drive fluid can be fuel diverted from the sustained combustion fuel system of the vehicle so that a separate hydraulic system is not required.

24 Claims, 8 Drawing Sheets

REVERSE FLOW FUELDRAULIC VALVE

CROSS-REFERENCE TO RELATED APPLICATION

This application claims benefit to U.S. provisional application Ser. No. 60/837,384, filed Aug. 11, 2006.

STATEMENT OF FEDERALLY SPONSORED RESEARCH OR DEVELOPMENT

This invention was made with government support under contract No. F33615-03-9-2422 awarded by the United States Air Force Research Laboratory. The government has certain rights in the invention.

BACKGROUND OF THE INVENTION

1. Technical Field

The present invention relates to metering valves, and in particular, to hydraulically driven valves suitable for use in high pressure environments, such as in the ignition and sustained combustion systems of air and space vehicles.

2. Description of the Related Art

Valves for metering fuel and other combustible media to engines in aircraft and spacecraft are known in the art, see e.g., U.S. Pat. No. 6,250,602 B1, assigned to the assignee of the present invention. Such valves are used to control the rate at which pressurized fuel, in a liquid or gaseous state, is supplied to the ignition injectors or the inlet orifices in the engine combustion chambers. The valves are relied upon to provide consistent and rapid control of flow rates of fuel at ignition and during sustained operation. Their operation is critical to proper performance of the vehicle. Poor valve operation can result in unintended engine shutdown and failure.

These valves can have movable stem-like valve members, or pintles, aligned with the outlet port of the valve for controlling the rate at which fuel flows to the engine. Pintle type valves are typically less affected by the temperatures and pressures of the fuel passing through the fuel chamber of the valve, due to their contoured head and axial movement. However, even pintle valves can be adversely affected by the high pressure and temperature conditions of jet engines.

Jet engines often ignite by burning an ignition medium, such as Ethylene, in a gaseous state at elevated pressures and temperatures. The extreme environment can cause significant loading on the metering components that can effect movement and sealing, and can lead to improper performance or failure of the valve.

Hydraulic valves have been used for such applications in which a pressurized fluid is used to drive an actuator in turn driving the metering components. To minimize weight in air and space vehicles, the hydraulic fluid driving the valve can be the pre-burned fuel in a liquid state. Such valves are known in the industry as "fueldraulic" valves.

Conventional fueldraulic valves typically do not provide adequate cooling for use with supersonic combustion ramjet ("scramjet") engines, which fly between Mach 4 and Mach 10 in the earth's atmosphere. However, U.S. Pat. No. 6,783,108 B2, assigned to the assignee of the present invention, discloses a fueldraulic valve that is designed to operate accurately and reliably in the high pressure and temperature conditions of delivery fuel to scramjet engines for sustained combustion. The disclosed valve managed heat dissipation using a unique baffle that better directed the fuel in proximity to the actuation, sealing and other components of the valve. However, the disclosed valve was designed for use in a sustained combustion fuel delivery system with a less extreme pressure environment of approximately 700 psia.

For the ignition system of a scramjet engine, on the other head, a very high pressure supply of ignition media, such as Ethylene at 4,000 psia, may be used, largely to reduce the size and weight of the tank. In order for conventional valves to accurately and reliably meter ignition media at such high pressures, a separate pressure regulator was used to step down the pressure. This two-stage approach is disadvantageous because the additional component both adds to the space and weight requirements of the system and introduces another point for breakdown, leakage and failure in the critical flow path of ignition media.

SUMMARY OF THE INVENTION

The present invention provides an improved hydraulically driven metering valve particularly designed to meter high pressure media accurately and reliably. The metering member of the valve moves parallel to the flow of the metered media and throttles off flow by moving directly counter to media flow. This reduces the side loading on the metering member and permits use of less robust components. The valve of the present invention is capable of operating in very high pressure environments, such as the ignition delivery system of scramjet engine powered flight vehicles without pre-metering pressure regulation.

Specifically, in one aspect the invention provides a reverse primary flow pressurized media driven valve. The valve has a housing with internal routing for separate flows of actuator media and primary media. The housing contains an actuator, a metering member and a nozzle body. The actuator is disposed for movement within the housing in response to flow of the actuator media to drive the metering member between open and closed positions. The nozzle body has an inlet passageway in communication with an inlet port so as to direct inlet flow of the primary media to a metering section of the nozzle body. In the closed position, the metering member engages the metering section to close off the inlet flow of the primary media. The metering member moves essentially parallel to inlet flow of primary media, and essentially encounter to the inlet flow of the primary media when moving toward the nozzle body.

The actuator media can be a liquid and the primary media can be gaseous, and particularly the actuator media can be a liquid fuel and the primary media can be a gaseous ignition media. The valve can thus be used to meter ignition media to the ignition injectors of scramjet engines.

The invention can thus provide a reverse flow fueldraulic valve for metering gaseous ignition media to an engine. The valve has a valve body defining a piston chamber and a metering chamber, and supply and return ports for passing pressurized fuel through the piston chamber and inlet and outlet ports for passing ignition media through the metering chamber. A piston disposed in the piston chamber is driven by the pressurized fuel along a stroke axis with respect to a nozzle body disposed in the metering chamber. The nozzle body has an inlet flow passageway in communication with the inlet port for inlet flow of ignition media and a metering section in communication with the inlet passageway. A metering member coupled to the piston is driven along the stroke axis in alignment with the metering section of the nozzle body in response to pressurized fuel flow to move from an open position counter to the direction of the inlet flow of ignition media to a closed position in which the metering member engages the metering section of the nozzle body to create a bubble tight seal.

As an example, the valve has been tested for successful operation for JP-7 liquid jet fuel as the actuator media at approximately −40° F. to 275° F. and 400 to 1,200 psia and gaseous Ethylene ignition media at approximately −40° F. to 200° F. and 400 to 4,000 psia. It should be noted that this is just one exemplary application for which the valve of the present invention is well-suited, however, since the actuation and primary media flow paths are isolated, the valve can also operate with each of the actuator and primary media being in either a gaseous or liquid state.

Separation of the actuator and primary media flows can be achieved by a shaft seal that is mounted onto the metering member by a special seal retainer. The seal retainer permits the seal to be slid onto the piston without being deformed significantly, which could otherwise lead to improper sealing of the flow streams. The seal retainer can be a hollow annular body surrounding the metering member, in which case the seal retainer has apertures aligned with an outlet port of the housing to facilitate proper flow of primary media downstream of the metering section of the nozzle body.

The metering section of the nozzle body can have a venturi passageway about the stroke axis with a converging section extending adjacent the inlet flow passageway and an essentially constant diameter throat extending axially from the converging section to a nozzle seat. A diverging section can extend axially from the nozzle seat.

The metering member can be a pintle having a contoured head defining a convex flow metering surface extending axially from a leading end to a shut-off section. The shut-off section defines a transition section that can have a prescribed constant diameter and extend for a prescribed axial length from the flow metering surface to a pintle seat projecting radially outward for engagement with the nozzle seat when in the closed position. The diameter of the transition section is less than that of the venturi throat so that an annular gap exists between the pintle and the venturi when in the closed position.

In another aspect the present invention can thus provide a reverse flow metering valve with a metering arrangement including uniquely configured nozzle body metering section and pintle head contouring. The contouring at the metering area is particularly critical given the reverse flow valve arrangement in which the primary media flows directly into the leading end of the pintle. The configuration of the present invention provides several advantages. First, a bubble tight seal is created by seating of the pintle into the metering section of the nozzle body. Second, the pintle seat does not adversely affect the critical flow contour of the primary media. Third, the force unbalance between the actuator force and the pressure force from the metered media is minimized. Fourth, the throat of the venturi will not be damaged by operation of the pintle.

All of this is achieved by precisely contouring the pintle. More specifically, the ratio of pintle seat diameter to pintle diameter (at the transition section) as well as the ratio of the pintle length to the transition section length is tightly controlled to avoid the pintle from losing metering accuracy in high pressures. Exemplary ranges for these ratios are 1.1 to 1.2 and 21 to 30, respectively. By controlling these ratios, the media will act on the flow metering surface rather than the pintle seat for most of the stroke, thereby maintaining accurate pintle metering and avoiding loss of accuracy that could occur if the pintle became unstable, unbalanced or otherwise functionally equivalent to an on/off valve.

Still further, the valve can be controlled by servo valve under electronic control. A position transducer, preferably a linear variable differential transformer, can disposed along the stroke axis with a sensing coil fixed with respect to the housing and a metallic probe coupled to the piston and movable within the center of the coil. The position transducer provides a feedback signal to the control unit corresponding to the position of the piston (and thus the position of the pintle with respect to the nozzle passageway). The control unit can adjust the input signal supplied to the servo valve in response to the feedback signal. The valve can thus provide a highly accurate metering in which deviations in the actual position of the pintle (and thereby flow rate of the gaseous fuel through the nozzle) are corrected electronically to match the input signal to the valve. This closed-loop position-feedback control also improves the dynamic response of the valve.

These and still other advantages of the invention will be apparent from the detailed description and drawings. What follows is a preferred embodiment of the present invention. To assess the full scope of the invention the claims should be looked to as the preferred embodiment is not intended as the only embodiment within the scope of the invention.

DETAILED DESCRIPTION OF THE PREFERRED EMBODIMENT(S)

The present invention provides an improved hydraulically driven metering valve particularly designed to meter high pressure media accurately and reliably. The metering member of the valve moves parallel to the flow of the metered media and throttles off flow by moving directly counter to media flow. This axial travel reduces the side loading on the metering member so that the valve can operate in high pressure environments in flight vehicles without excessively large and heavy metering components.

Figure 1:
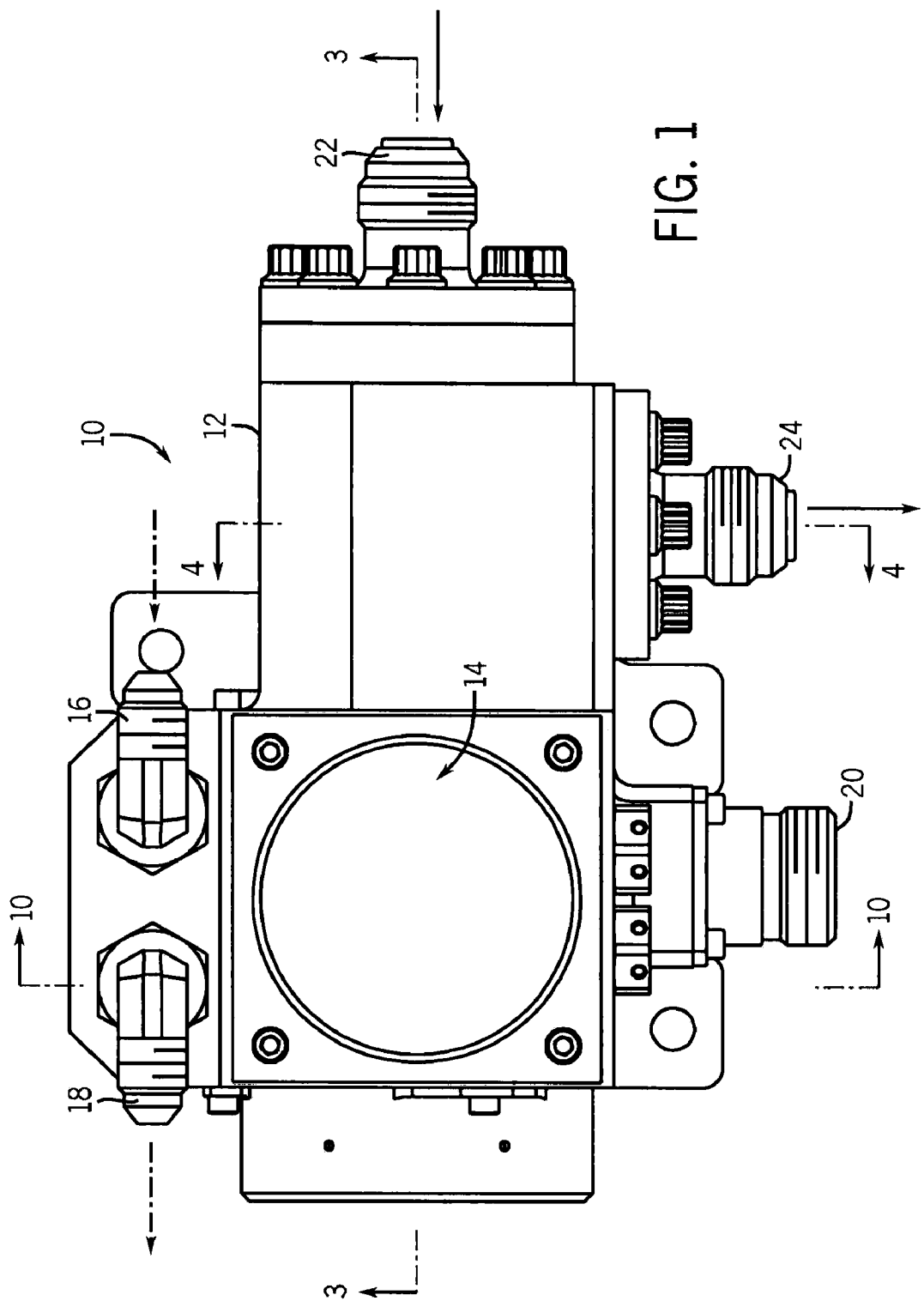
FIG. 1 is a top plan view of a reverse flow fueldraulic metering valve according to one embodiment of the present invention.
Figure 2:
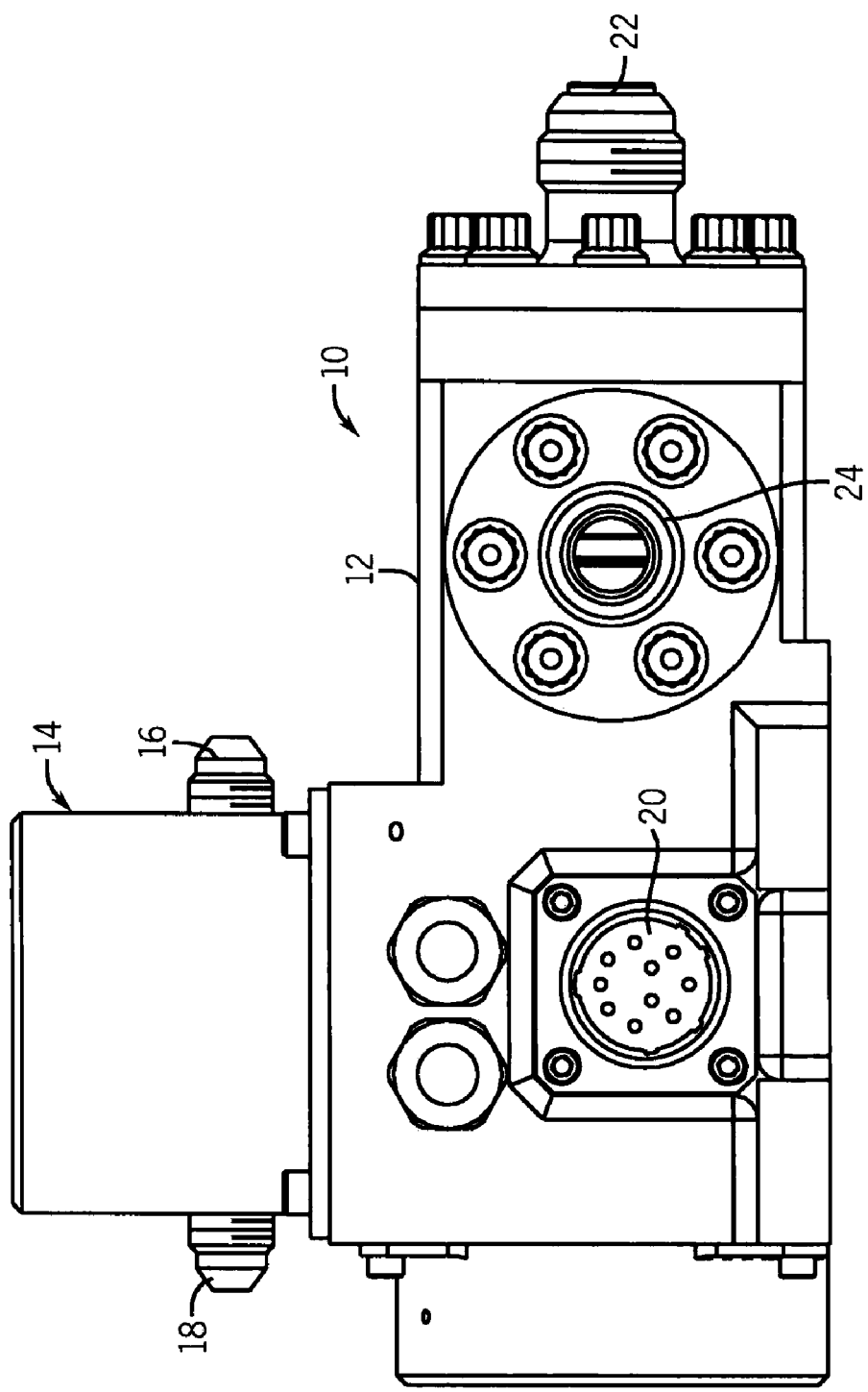
FIG. 2 is a side elevational view of the valve of FIG. 1.

Referring now to the drawings, FIGS. 1 and 2 illustrate the exterior of one embodiment of a reverse flow metering valve 10 according to the present invention. The valve 10 has a housing or valve body 12 to which is mounted a servo valve 14. The servo valve 14 can be any conventional servo valve capable of accurately controlling supply and return flow in response to command input signals with low hysteresis. A suitable servo valve is commercially available from the assignee of the present invention, Jansen's Aircraft Systems Controls, Inc. of Tempe, Ariz. As such, the servo valve will not be discussed in detail. Generally, however, the servo valve will include a sensing coil and an armature moved by magnetic force generated by the coil. The servo valve 14 is electrically coupled to an electronic control unit (not shown), which in the case of a jet or scramjet engine application, can be an integral or discrete part of a vehicle system computer.

Figure 10:
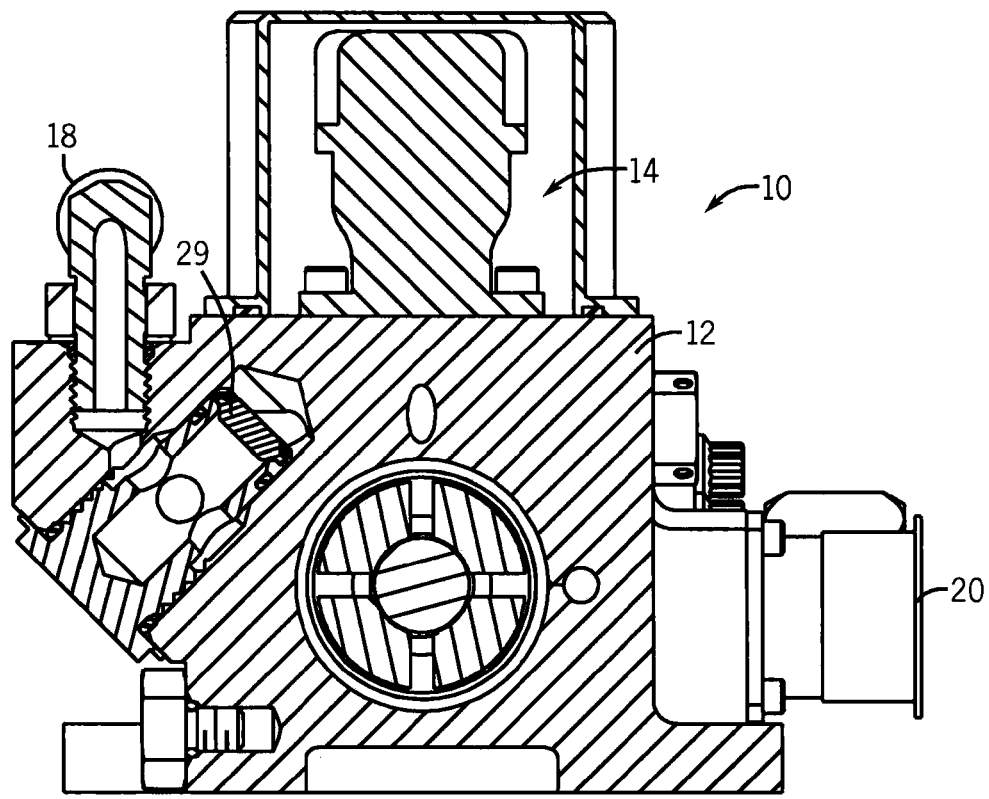
FIG. 10 is an end sectional view taken along line 10-10 of FIG. 1 showing the location of on-board media filters.

The valve body 12 has a supply fitting 16 for connecting a pressurized actuator media line (not shown), a return fitting 18 for returning the drive media to a supply tank (not shown), an electrical connector 20 for electrically coupling the valve 10 to control electronics (not shown), an inlet fitting 22 for connecting a primary media supply line (not shown) and an outlet fitting 24 for connecting an output line (not shown) for metering the primary media. These fittings are mounted in associated ports in communication with the interior of the valve body 12, the supply 16 and return 18 fittings communicating with an actuator section 26 of the valve 10 and the inlet 22 and outlet fittings 24 communicating with a metering section 28 of the valve 10 (see FIG. 3). As shown in FIG. 10, one or more filters 29 can be mounted to the valve body 12 to filter the actuator media.

The actuator media can be any suitable fluid brought into the valve body 12 under pressure. The primary media can be any suitable liquid or gaseous media. When the valve is to be used with scramjet engines, it is preferably a "fueldraulic" valve in which the actuator media is fuel, such as a hydrogen-based liquid jet fuel. The primary media can be an ignition media used to ignite the scramjet engine, such as gaseous Ethylene. A gaseous hydrogen and silane mixture could also be used for such applications. At ignition, the valve 10 is expected to realize temperatures ranging from −40° F. to 275° F. and pressures of 400 to 1,200 psia at the actuator section 26 and temperatures of −40° F. to 200° F. and pressures of 400 to 4,000 psia at the metering section 28.

Figure 3:
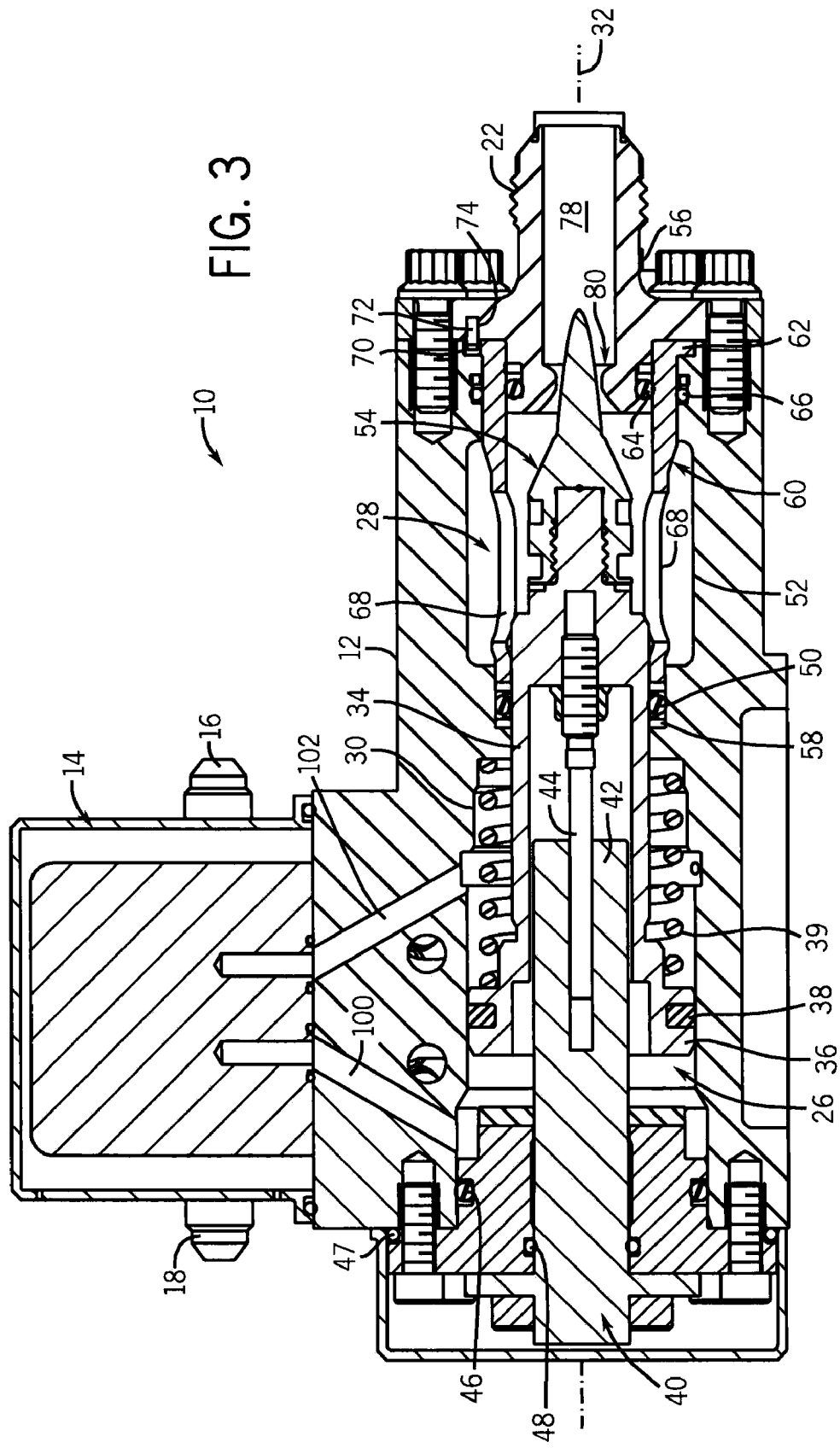
FIG. 3 is a side sectional view taken along line 3-3 of FIG. 1 with actuator and metering assemblies shown in a fully open position.
Figure 4:
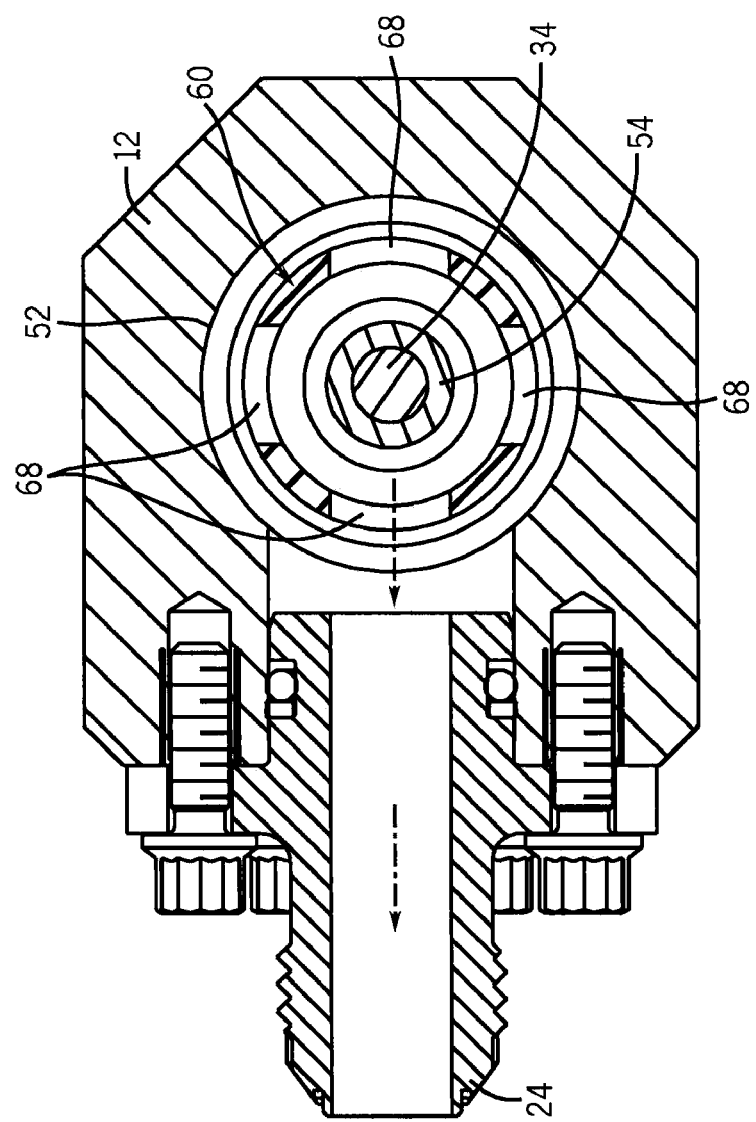
FIG. 4 is an end sectional view taken along line 4-4 of FIG. 1.

Referring to FIGS. 3 and 4, the internal components of the valve 10 will now be described. The valve body 12 defines an open-ended piston chamber 30 concentric with a stoke axis 32 passing through the inlet fitting 22. A piston 34 in the piston chamber 30 has an enlarged head 36 with a circumferential groove containing a piston ring 38 slidably sealing against the inner diameter of the piston chamber 30. A return spring 39 is mounted about the piston 34 and acts against the head 36 to bias the piston 34 in a direction away from the metering section 28.

The body of the piston 34 is hollow and open at one end to slidably receive a position transducer, preferably a cylindrical linear variable differential transformer (LVDT) 40. The LVDT 40 is mounted axially within the center of the piston 34 and includes a sensing coil 42 defining an axial passage for an elongated metallic probe 44 mounted to the opposite end of the piston 34, which moves with the piston 34 with respect to the sensing coil 42. The LVDT 40 is bolted to the valve body 12 at the open end of the piston chamber 30, which in turn mounts the piston 34, and is sealed by seals 46, 47 and 48. Conductors (not shown) run from the sensing coil 42 to the electrical connector 20.

A shaft seal 50 seals against the outer diameter of the piston 34 (slidably) and against the inner diameter of a metering chamber 52 in the metering section 28 of the valve 10, which contains a metering member in the form of a pintle 54, mounted to the end of the piston 34, and a nozzle body 56. The shaft seal 50 separates the actuator media from the primary media. The shaft seal 50 is thus a critical seal, especially in scramjet engine applications in which it separates the drive fuel from the extremely high pressure gaseous ignition media, and must exhibit very low (near zero) leakage. The shaft seal 50 is supported by a Teflon® backup ring 58 and care is taken to ensure that the seal 50 and backup ring 58 do not undergo unnecessary deformation during installation. A seal retainer 60 holds the shaft seal 50 and back up ring 58 in place about the piston 34. The seal retainer 60 has an annular body with a flanged end 62 that seats against the valve body 12 at the open end of the metering section 28 and is mounted in place by bolting down the inlet fitting 22. Seals 64 and 66 seal the inner diameter and outer diameter of the seal retainer 60 with the inlet fitting 22 and the interior of the valve body 12, respectively. The seal retainer 60 has four elongate apertures 68, at least one of which is aligned with the outlet fitting 24 to facilitate downstream flow of the primary media. The flanged end 62 of the seal retainer 60 has a small keyhole 70 that receives a pin 72, also received in a small hole 74 in the outlet fitting 24, to ensure proper orientation of the seal retainer 60.

The seal retainer 60 is fixed relative to the valve body 12, however, the piston 34 is able to slide within the seat retainer 60. The seal retainer 60 is slidably mounted to the piston 34 about the pintle 54, which is directly mounted to the piston 34 by a threaded connection to move along the stroke 32 axis with the piston 34. The pintle 54 has a unique contour, as discussed below, designed for precise metering in very high pressure environments. The pintle 54 cooperates with the nozzle body 56 to control flow of the primary media.

Figure 8:
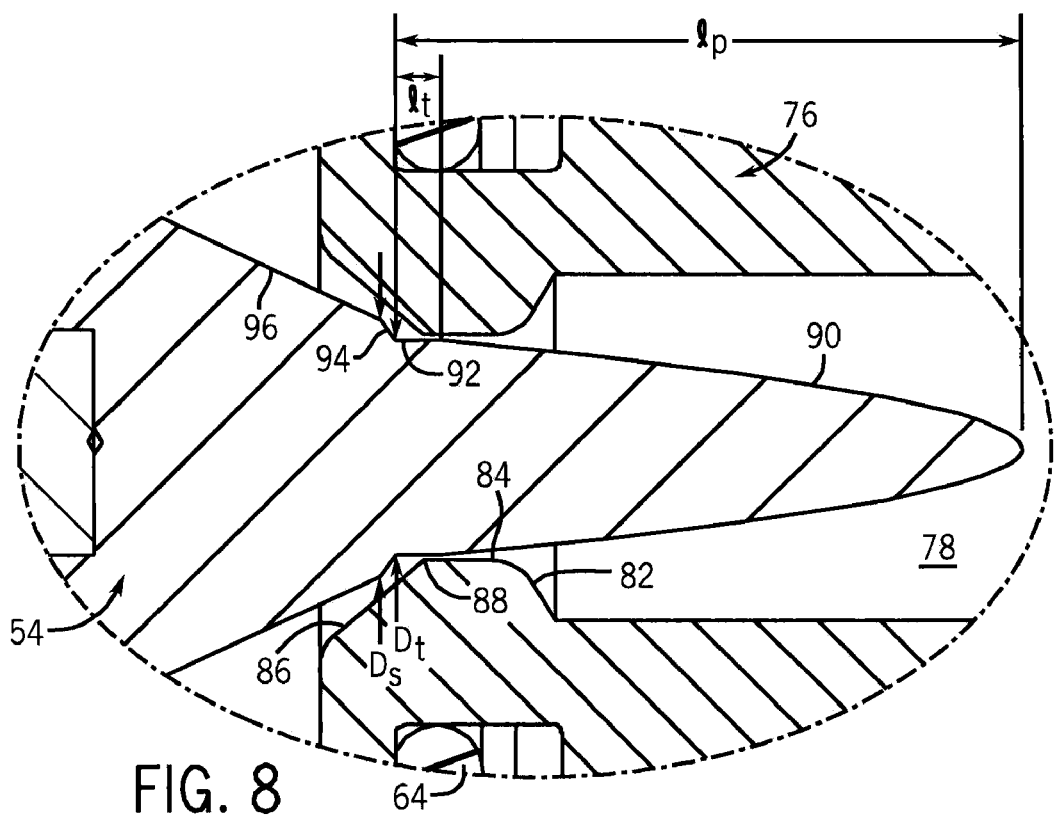
FIG. 8 is an enlarged partial sectional view taken along arc 8-8 of FIG. 6, showing the contour profiles of pintle and venturi metering components of the valve of FIG. 1.

Referring to FIGS. 3 and 8, the inlet fitting 22 defines the integral nozzle body 56 mounted within the metering section 28 of the valve body 12 concentric with the stroke axis 32. The nozzle body 56 defines an inlet passageway 78 extending from the open end of the outlet fitting 24 to a venturi passageway 80 defined by an inner end of the nozzle body 56. The venturi passageway 80 has a short, belled converging section 82, a short, narrow cylindrical throat 84 and a diverging section 86. A circular nozzle seat 88 is located at the transition from the throat 84 to the diverging section 86. As is understood in the art, the venturi passageway 80 facilities sonic flow velocities at the throat 84.

The throat 80 of the venturi passageway 80 is closed by the pintle 54. With reference to FIG. 8, the pintle 54 has an elongated, rounded conical flow metering surface 90 contoured to interact with the high pressure primary media to allow for high resolution metering adjustment and control. The flow metering surface 90 is sized to fit through the throat 80 and into the inlet passageway 78 of the nozzle body 56. The pintle 54 also defines a shut-off section including a transition region 92 and a pintle seat 94. The transition region 92 is adjacent to the flow metering surface 90 and has an essentially constant diameter, and the pintle seat 94 diverges radially from the transition region 92 a short distance. The sizing of the shut-off section is carefully selected to provide optimum metering characteristics, as discussed in detail below. A smooth, conical diverging section 96 extends back from the pintle seat 94.

Figure 5:
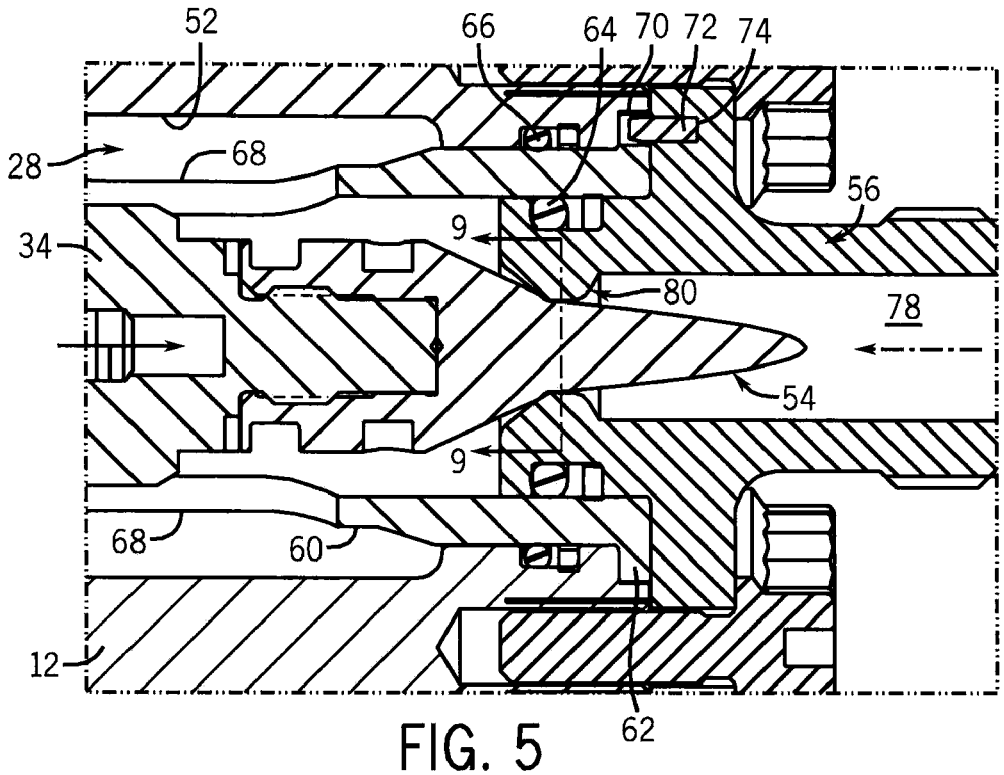
FIG. 5 is an enlarged partial sectional view of the metering section of the valve in the fully closed position.
Figure 6:
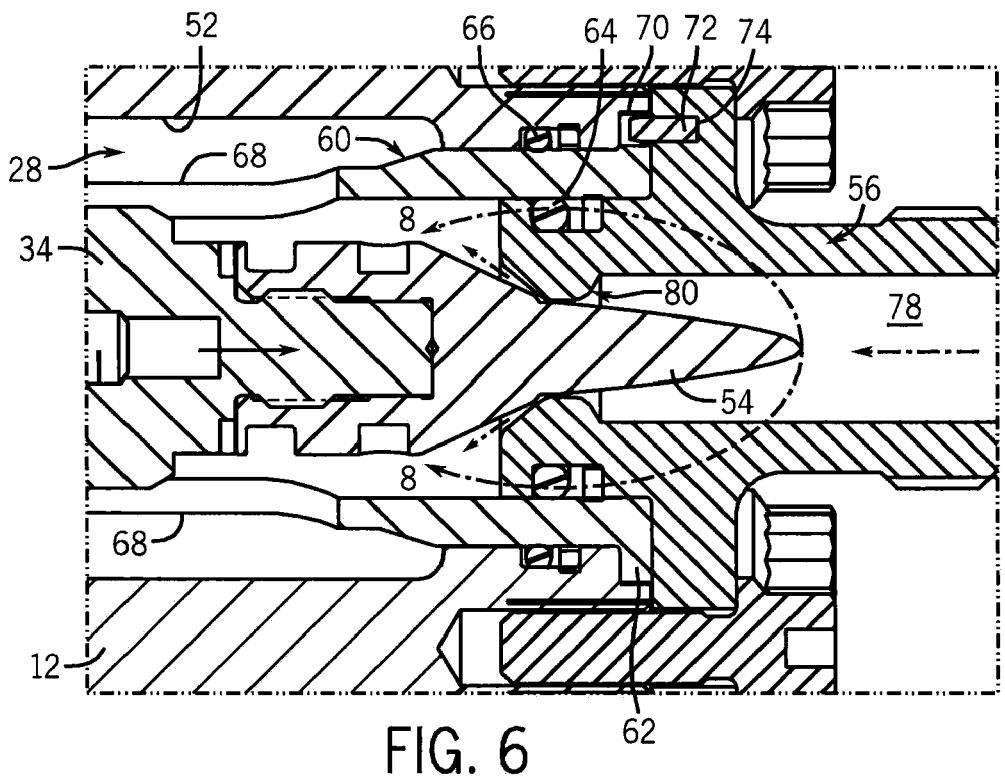
FIG. 6 is a partial sectional view similar to FIG. 5 showing the metering section of the valve at a constant flow open position.
Figure 9:
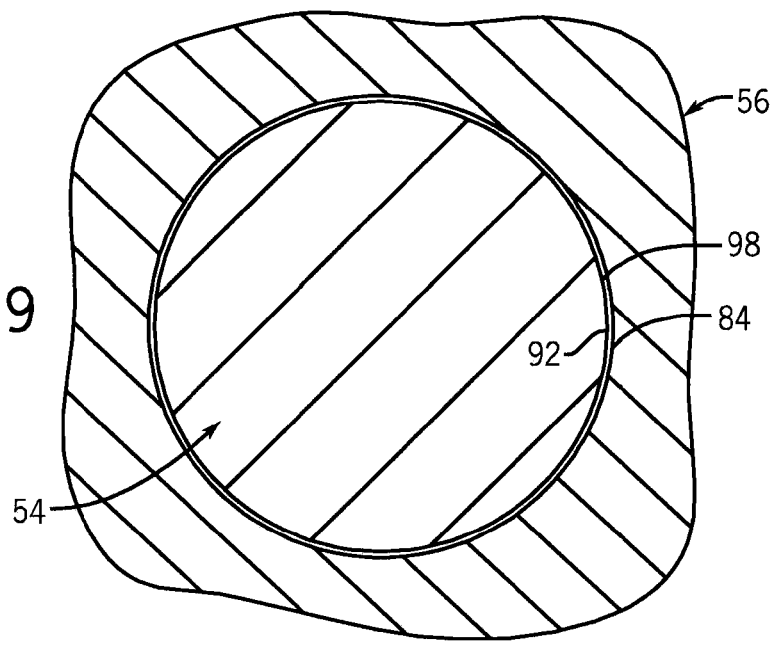
FIG. 9 is an enlarged partial sectional view taken along line 9-9 of FIG. 5 showing an annular gap providing clearance between the pintle and venturi metering components of the valve of FIG. 1 in the closed position.

With continued reference to FIG. 8 and also FIG. 9, the diameter of the transition region 92 is sized smaller than the inner diameter of the throat 84 of the venturi passageway 80 so there is an annular gap 98 providing clearance between the pintle 54 and the nozzle body 56 when the valve 10 is in the closed position shown in FIG. 5. This reduces the possibility of the throat 84 of the venturi passageway 80 being damaged by the pintle 54. It also provides a critical function during the initial opening of the valve 10 just after the pintle seat 94 is unseated from the nozzle seat 88, such as when in the position shown in FIGS. 6 and 8, in that it allows an initial constant volume of primary media to flow during that initial part of the stroke. This, and the sizing of the pintle seat 94 diameter, prevents the primary media from acting primarily on the pintle seat 94, but instead will act on the flow metering surface 90 for the vast majority of the stroke.

Figure 11:
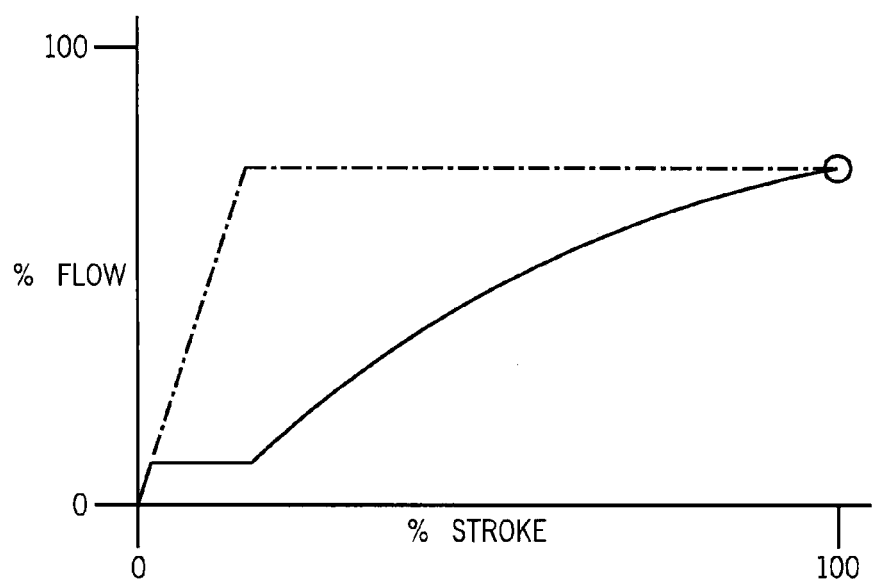
FIG. 11 is a graph plotting flow versus stroke for the valve of FIG. 1 in relation to that of an on/off poppet-type valve (shown in phantom).

FIG. 11 illustrates the flow characteristics of the valve 10 with the pintle 54 configured as described above in comparison to that of an on/off poppet type valve, represented by the dashed line. First, the poppet type valve will follow a steep, generally linear high gain line from the beginning of the stroke when the valve is closed to just after the valve is opened, the gain being flat from that point to the end of the stroke. In contrast, the metering arrangement of the present invention flows the curve shown in solid in FIG. 11. Specifically, during the very initial part of the stroke when the pintle 54 unseats, the flow will follow the high gain line as the primary media momentarily acts on the pintle seat 94. Then, following this brief, transient period after unseating, as when in the position shown in FIGS. 6 and 8, the flow will promptly break off from the high gain line and follow a flat, constant flow line during the part of the stroke in which the transition region 92 is within the venturi throat 84. Then, for the rest of the stroke, the flow will follow a smooth, predictable curve during which the flow metering surface 90 is within the venturi throat 84. This pintle configuration and sizing allows the valve to maintain extremely accurate metering of the primary media at very high pressures, such as 4,000 psia or more.

In addition to having high metering accuracy and resolution, the pintle and venturi arrangement of the valve 10 provides for total flow shut-off when the pintle seat 94 seats against the nozzle seat 88. In fact, the metering arrangement of the valve 10 is capable of providing absolute bubble tight sealing with zero leakage. Not only is this type of robust sealing achieved without adversely affecting the critical flow path of the primary media, as discussed above, it does so with minimal force unbalance on the pintle 54. In other words, the pintle 54 does not tend to unseat from unbalanced pressure forces, despite the disparate pressures of the actuator media and the primary media. In addition to not unseating unexpectedly, this avoids the loss of accuracy that could occur if the pintle 54 was unbalanced.

Through empirical study and valve optimization, the inventors of the present invention have determined that the diameter of the pintle seat 94 and the length and diameter of the transition region 92 are most critical to metering performance. In particular, with reference to FIG. 8, it was determined that the ratio ($D_s/D_t$) of the diameter ($D_s$) of the pintle seat 94 to the diameter ($D_t$) of the transition region 92 should be between 1.1 and 1.17, more preferably 1.12, and preferably is no greater than 1.2. And, the ratio ($I_p/I_t$) of the pintle length ($I_p$) to the transition region length ($I_t$) should be between 21 and 27, more preferably 24, and preferably no greater than 30.

Figure 7:
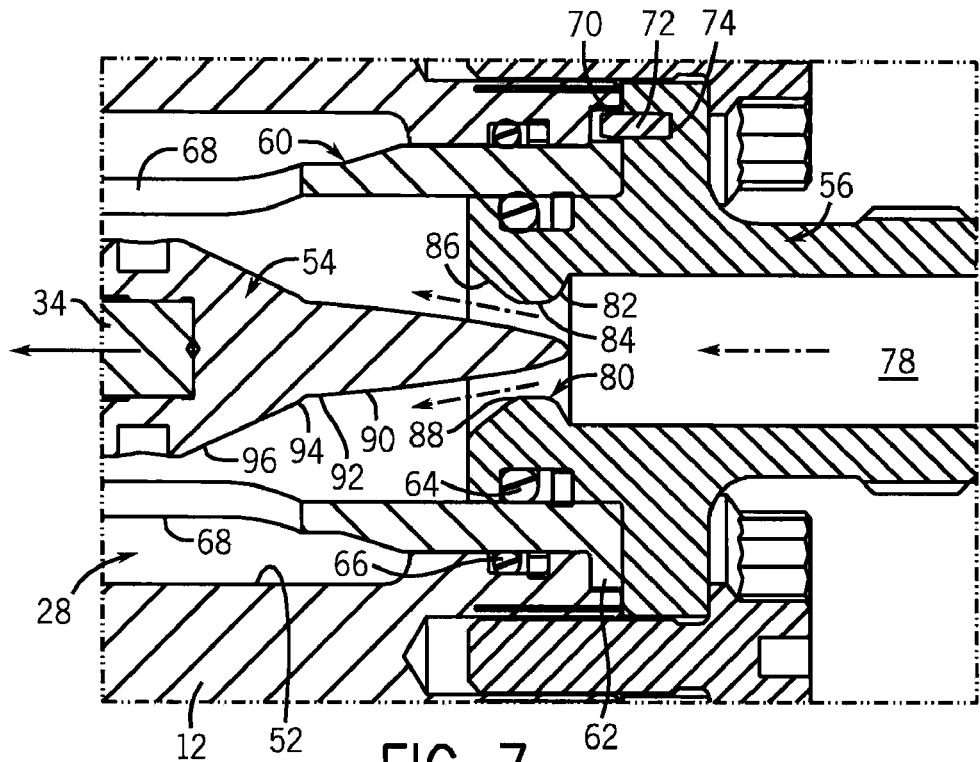
FIG. 7 is a partial sectional view similar to FIG. 5 showing the metering section of the valve in the fully open position.

Movement of the pintle 54 is driven by the piston 34 in response to flow of the actuator media. As shown in FIG. 3, the actuator media is routed to and from the servo valve 14 via the respective supply 16 and return 18 fittings, and into the valve housing 12 via two internal control passages 100 and 102. In response to input command signals from the electronic control unit, the servo valve 14 controls the flow of actuator media through the actuator 26 section of the valve 10. According to the command input, the actuator media will drive the piston 34 (and thereby the pintle 54) axially back and forth along the stroke axis 32 to change the throttling of the venturi passageway 80 between the closed position shown in FIG. 5 and the open position shown in FIG. 7, and thus control the flow of primary media.

Importantly, the piston 34, and thus the pintle 54, moves axially along the stroke axis 32 generally parallel to the incoming flow of the primary media. Even more, the valve 10 is configured so that the pintle 54 moves directly counter to the inlet flow when throttling the valve 10, that is when moving toward the nozzle body 56 to reduce or shut-off flow. This parallel to flow movement, and particularly the reverse direction throttling, significantly reduces the loading, especially side loading, on the pintle 54 and the piston 34. This permits the use of less robust actuation and metering components, thereby reducing size and/or weight requirements of the valve 10, which are extremely important factors in flight vehicles, particularly hypersonic vehicles.

The movement of the piston 34 will cause the metallic probe 44 to translate with respect to the sensing coil 42 and thus vary the electrical signal from the LVDT 40. This signal is fed back to the control unit, which can execute position correcting signals for the servo valve 14 if the actual position differs from that of the command input. This closed loop position feedback circuit thus further improves the valve's metering accuracy. Although not shown, a pressure gauge or other monitoring hardware can be used to monitor the pressure in the valve 10 at the return side of the servo valve 14. This data can also be used to control and verify the accuracy of the valve 10. In any event, the servo valve 14 open and closes the associates to deliver drive flow and take return flow through either of control passageways 100 and 102. Since actuator media enters or leaves the piston chamber 30 via control passageways 100 and 102 located at opposite axial sides of the piston head 36, the actuator media can provide push-pull input to the piston 34 and thus greater position control.

It should be appreciated that merely a single embodiment of the invention has been described above. However, many modifications and variations to the described embodiment will be apparent to those skilled in the art, which will be within the spirit and scope of the invention. Moreover, the described scramjet engine application is only one of the many uses for the valve of the present invention; it is also possible for the valve construction described herein to be used to meter liquid media and/or be driven by a pressurized liquid or gas other than fuel. Therefore, the invention should not be limited to the described embodiment. To ascertain the full scope of the invention, the following claims should be referenced.

We claim:

1. A reverse primary flow pressurized media driven valve, comprising:
    a housing having internal routing for separate flows of actuator media and primary media, the primary media entering the housing through an inlet port;
    an actuator disposed within the housing for movement in response to flow of the actuator media;
    a nozzle body disposed in the housing and having an inlet passageway in communication with the inlet port so as to direct inlet flow of the primary media to a metering section of the nozzle body; and
    a metering member disposed in the housing for movement by the actuator with respect to the nozzle body between an open position and a closed position in which the metering member engages the metering section to close off the inlet flow of the primary media, wherein the metering member moves essentially parallel to the inlet flow of the primary media and essentially counter to the inlet flow of primary media when moving toward the nozzle body and wherein the metering member has a contoured head defining a convex flow metering surface extending axially from a leading end to a contoured shut-off section, wherein the shut-off section defines a constant diameter transition section extending axially from the flow metering surface to a seat projecting radially outward for engagement with the nozzle body when in the closed position.

2. The valve of claim 1, wherein the metering member is a pintle and the seat is a pintle seat.

3. The valve of claim 2, wherein the pintle seat has an outer diameter and wherein the ratio of the pintle diameter to the transition section diameter is no greater than 1.2.

4. The valve of claim 2, wherein the transition section has a length and the pintle has a length and wherein the ratio of the pintle length to the transition section length is no greater than 30.

5. The valve of claim 2, wherein the metering section defines a venturi having a converging section adjacent the inlet flow passageway and an essentially constant diameter throat extending axially from the converging section to a nozzle seat, wherein the pintle transition section diameter is less than the venturi throat diameter so as to form an annular gap therebetween when in the closed position.

6. The valve of claim 1, wherein the actuator media is a liquid and the primary media is gaseous.

7. The valve of claim 6, wherein the actuator media is liquid fuel and the primary media is gaseous ignition media.

8. The valve of claim 1, wherein the actuator is a piston disposed in a piston chamber of the housing and coupled to the metering member.

9. The valve of claim 8, wherein the piston has a head that slidably seals against the piston chamber and wherein actuator media is in communication with opposite sides of the piston head.

10. The valve of claim 1, further comprising a seal retainer for mounting a seal separating the actuator media from the primary media disposed.

11. The valve of claim 10, wherein the seal retainer is annular and disposed about the metering member, and wherein the seal retainer has apertures aligned with an outlet port of the housing for flow of primary media downstream of the metering section.

12. The valve of claim 1, further including a servo valve and an electronic control unit providing an input signal to the servo valve for controlling flow of the actuator media.

13. The valve of claim 12, further including a position transducer having a fixed sensing coil and a probe coupled to the actuator to be movable with respect to the coil.

14. A reverse flow fueldraulic valve for metering gaseous ignition media to an engine, the valve comprising:
a valve body defining a piston chamber and a metering chamber, the body having supply and return ports for passing pressurized fuel through the piston chamber and inlet and outlet ports for passing ignition media through the metering chamber;
a piston disposed in the piston chamber driven by the pressurized fuel along a stroke axis;
a nozzle body disposed in the metering chamber and having an inlet flow passageway in communication with the inlet port for inlet flow of ignition media and
a metering section in communication with the inlet passageway; and
a pintle coupled to the piston along the stroke axis in alignment with the metering section of the nozzle body and driven by the piston in response to pressurized fuel flow to move from an open position counter to the direction of the inlet flow of ignition media to a closed position in which the pintle engages the metering section of the nozzle body to create a bubble tight seal, wherein the pintle has a contoured head defining a convex flow metering surface extending axially from a leading end to a contoured shut-off section, wherein the shut-off section defines a constant diameter transition section extending axially from the flow metering surface to a pintle seat projecting radially outward for engagement with the nozzle body when in the closed position.

15. The valve of claim 14, further comprising a seal retainer for mounting a seal separating the actuator media from the primary media disposed.

16. The valve of claim 14, wherein the pintle seat has an outer diameter and wherein the ratio of the pintle diameter to the transition section diameter is no greater than 1.2.

17. The valve of claim 14, wherein the transition section has a length and the pintle has a length and wherein the ratio of the pintle length to the transition section length is no greater than 30.

18. The valve of claim 14, wherein the metering section defines a venturi having a converging section adjacent the inlet flow passageway and an essentially constant diameter throat extending axially from the converging section to the nozzle seat, wherein the pintle transition section diameter is less than the venturi throat diameter so as to form an annular gap therebetween when in the closed position.

19. A reverse flow metering valve, comprising:
a housing having inlet and outlet ports;
a nozzle body disposed in the housing in communication with the inlet port so as to define an inlet flow passageway directing inlet flow along a stroke axis to a metering section of the nozzle body defining a seat; and
a pintle disposed in the housing for movement with respect to the nozzle body along the stroke axis, the pintle moving counter to the inlet flow when moving toward the nozzle body, the pintle having a contoured head defining a convex flow metering surface extending axially from a leading end to a contoured shut-off section;
wherein the shut-off section defines a constant diameter transition section extending axially from the flow metering surface to a pintle seat projecting radially outward for engagement with the nozzle seat so as to create bubble tight seal of the metering section when in a closed position.

20. The valve of claim 19, wherein the pintle seat has an outer diameter and wherein the ratio of the pintle diameter to the transition section diameter is no greater than 1.2.

21. The valve of claim 19, wherein the transition section has a length and the pintle has a length and wherein the ratio of the pintle length to the transition section length is no greater than 30.

22. The valve of claim 19, wherein the metering section defines a venturi having a converging section adjacent the inlet flow passageway and an essentially constant diameter throat extending axially from the converging section to the nozzle seat.

23. The valve of claim 22, wherein the pintle transition section diameter is less than the venturi throat diameter so as to form an annular gap therebetween when in the closed position.

24. The valve of claim 19, wherein the housing has internal routing for separate flows of actuator media and primary media, the primary media entering the housing through the inlet port and being metered by the pintle, and wherein the pintle moves between an open position and the closed position in response to actuator media flow.

* * * * *